United States Patent

[72] Inventor Hans R. Rottmann
  Poughkeepsie, New York
[21] Appl. No. 643,621
[22] Filed June 5, 1967
[45] Patented Oct. 6, 1970
[73] Assignee International Business Machines Corporation
  Armonk, New York
  a corporation of New York

[54] MULTI-LENS DEVICES FOR THE FABRICATION OF SEMICONDUCTOR DEVICES
  7 Claims, 35 Drawing Figs.
[52] U.S. Cl. .................................................. 95/18,
  355/46, 355/54
[51] Int. Cl. ................................................ G03b 27/04
[50] Field of Search ......................................... 95/18;
  355/46, 54

[56] References Cited
UNITED STATES PATENTS
| | | | |
|---|---|---|---|
| 470,858 | 3/1892 | Klinger | 350/179X |
| 1,521,563 | 12/1924 | Pfleegor | 350/179 |
| 1,935,471 | 11/1933 | Kanolt | 95/18(P)UX |
| 2,174,003 | 9/1939 | Ives | 95/18(P)UX |

*Primary Examiner*—John M. Horan
*Attorneys*—Hanifin and Jancin and Henry Powers ABSTRACT: An optical system having a multitude of minute lenses disposed within a laminated structure in an array forming a lenticular screen of the "Fly's Eye" type. A surface of a transparent component sheet member is recessed with a multitude of lenticular cavities which are filled with a refractive fluid. The recessed surface has juxtaposed over it, in order, an opaque aperture plate and a transparent cover member with the aperture plate having a multitude of openings corresponding in number to and in register with the fluid filled cavities.

Patent No. 3,532,038

Patented Oct. 6, 1970
3,532,038
Sheet 1 of 7
FIG. 1
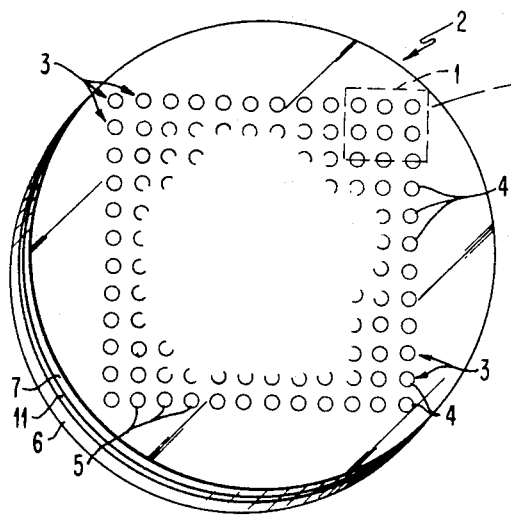
FIG. 2
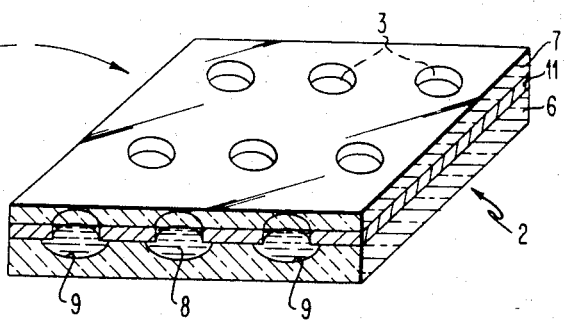
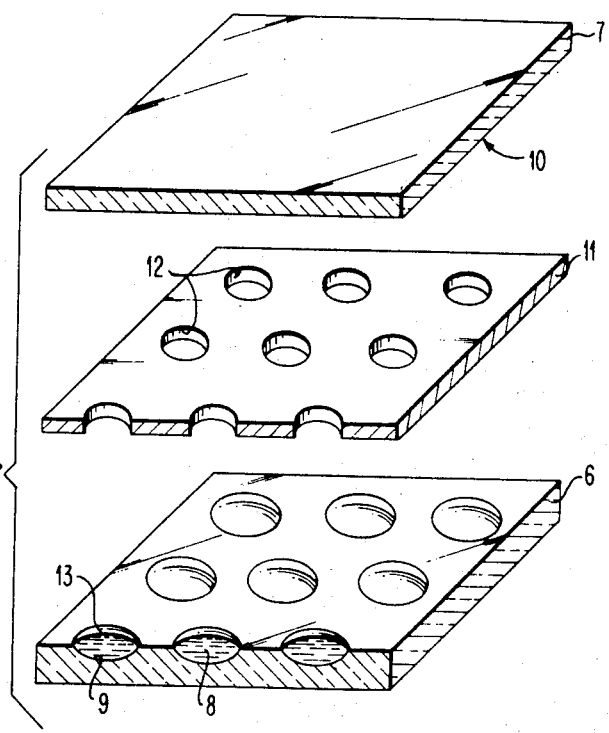
FIG. 2A
FIG. 3
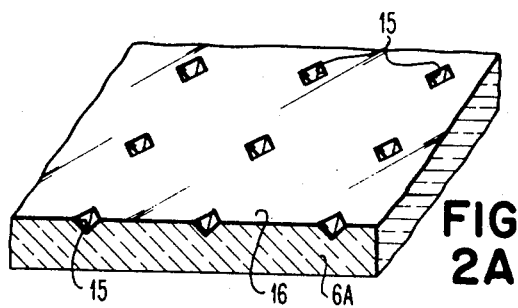
FIG. 4
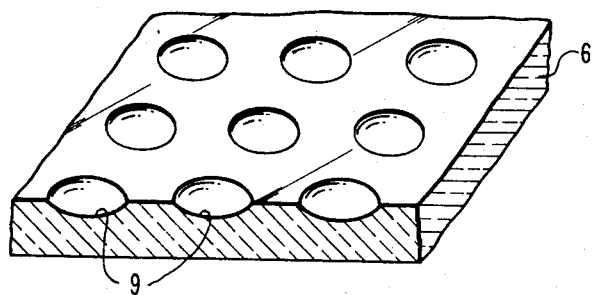
INVENTOR
HANS R. ROTTMANN
BY *Harry Powers*
ATTORNEY

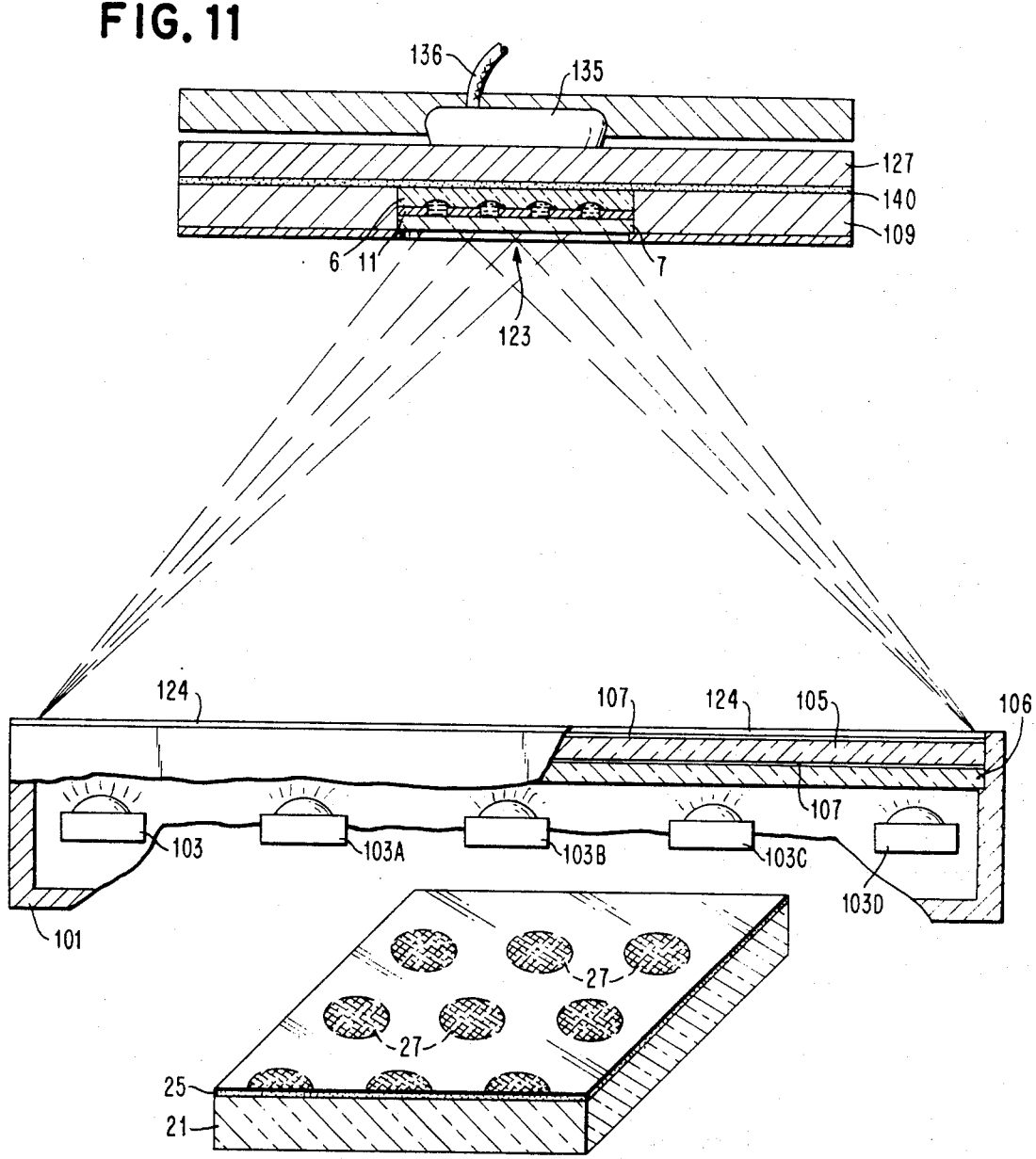
FIG. 11
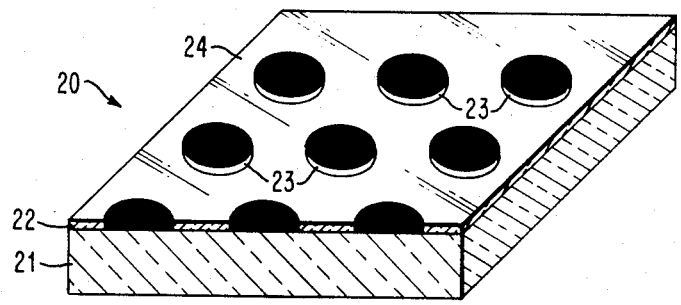
FIG. 5A
FIG. 5B

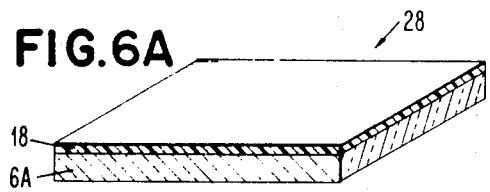
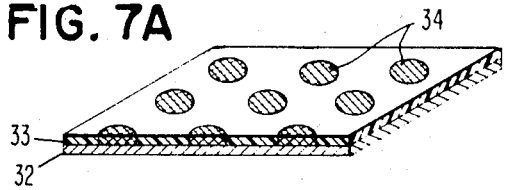
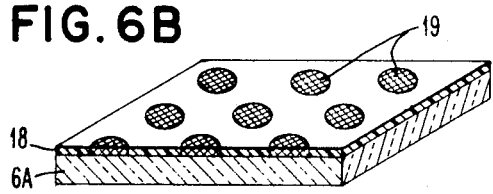
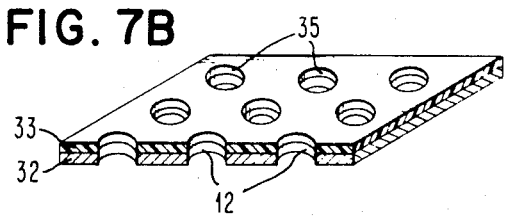
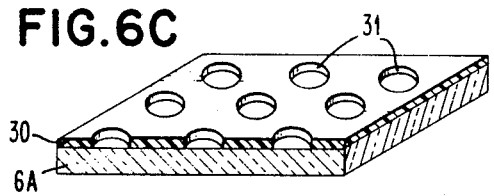
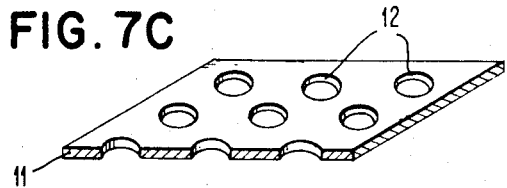
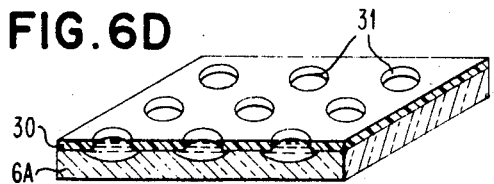
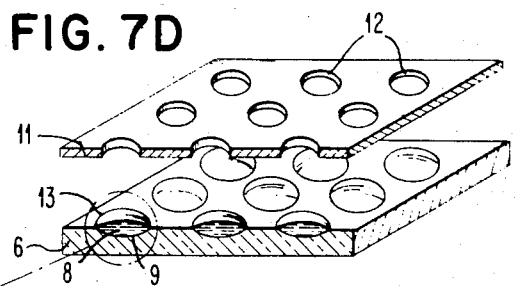
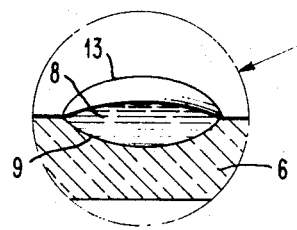
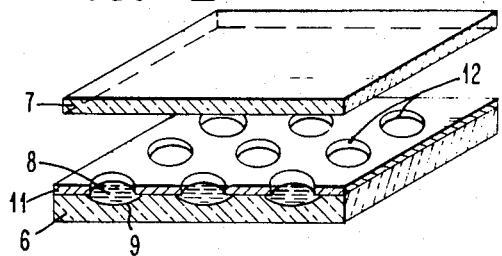
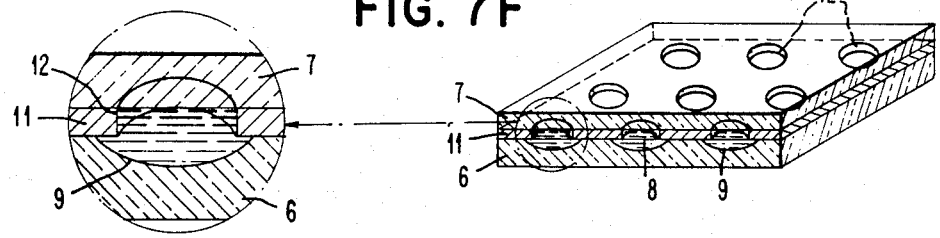

Patented Oct. 6, 1970

Patented Oct. 6, 1970 3,532,038

MULTI-LENS DEVICES FOR THE FABRICATION OF SEMICONDUCTOR DEVICES

FIELD OF THE INVENTION

This invention relates to image projecting devices and more particularly to an integral planar multi-lens structure of the "Fly's Eye" type adapted for the reproduction of a plurality of images from a single configuration.

Although the multi-lens structures comprehended within this invention have various applications, as for example, projection of colored pictures and other reproduction techniques, the specific application to which the invention will be directed herein contemplates its specific utilization in the manufacture of semiconductor devices; as for example in the fabrication of photolithographic masks therefor.

DESCRIPTION OF THE PRIOR ART

In the fabrication of semiconductor devices for the electronics and computer industries, various techniques are presently employed for the miniaturization of solid state components to virtually microscopic size. In this respect various processes are employed to produce large numbers of semiconductor devices from a single wafer of semiconductor material. For example, in one case, several hundred, or as many as a thousand transistors having substantially identical dimensional and electrical characteristics are formed from a single semiconductor starting wafer which is one-half inch to one inch square and which has a thickness of about 10 mils.

In one manufacturing process, silicon dioxide is grown or evaporated to form a thin impervious adherent film on a predetermined surface of a semiconductor wafer. A geometric pattern of apertures is established in the film by etching to expose predetermined areas of the surface of the wafer. The exposed areas or regions are then subjected to the influence of vapors or other sources of active impurities which modify the conductivity of the exposed regions, or they may be conditioned to receive evaporated metal contacts which serve as terminals. PN junctions and terminals for the regions of different conductivities are thus formed in predetermined areas of a semiconductor device by the use of apertured films.

The photo-engraving technique is one of several that have been used in the manufacture of semiconductor devices for establishing film apertures in desired locations. In this technique, after the wafer has been covered with a continuous coherent protective film, such as silicon dioxide, the wafer is then coated (over the protective film) with a photosensitive material, conventionally known as photoresist. The latter is then exposed to light through a negative photographic mask or stencil that has patterns of opaque and transparent areas in predetermined locations. Generally, the portions of the resist that were exposed to light become insoluble during development thereof and remain on the silicon dioxide film while the portions of the resist that were protected from light by the opaque areas in the stencil are removed during developing, thus leaving a plurality of apertures in the resist. Alternatively, positive photographic masks or stencils may be employed in conjunction with other resists, e.g., the Eastman Kodak Transfax Resist, and techniques such as described in U.S. Pat. No. 2,666,008, granted Jan. 12, 1954, to obtain similar apertures in the resist coated on the oxidized surface of the semiconductor wafer. In the latter technique, exposed surfaces of the resist are removed.

Regardless of the type of resists or the techniques employed, the resultant apertures in the resist expose, in turn, small areas of the silicon dioxide film on the semiconductor wafer. Thereafter, a corrosive fluid, such as hydrofluoric acid, is applied to the exposed areas of the silicon dioxide coating (on the semiconductor wafer), to etch a pattern of corresponding apertures in the silicon dioxide film. Subsequently, conductivity determining impurity materials are diffused through these apertures into the semiconductor wafer to create, for example, a pattern of PN junctions.

In order to develop a desired geometric configuration for all semiconductor units, the wafer normally undergoes a sequence of operations that includes a repetition of the steps above described at intervals during the sequence. At such times, the wafer is again coated with photosensitive resists, which are again exposed and developed in the manner described. Normally, a series of masks is provided, and a different mask is used at each exposure step in order to develop a desired geometric design of exposed and unexposed areas on the surface of the wafer for subsequent etching, diffusion or deposition operations.

As can be seen from the foregoing, a plurality of photolithographic masks is successively registered with discrete and minute semiconductor devices on a wafer to establish patterns in the individual devices. For this reason, it is necessary that each semiconductor design or pattern area produced, for etching or deposition following exposure through a particular mask, must be registered as perfectly as possible with those areas that are produced after exposure through other masks used earlier or later in the process.

One method and apparatus for fabricating masks for such indicated precise requirements is described in U.S. Letters Pat. No. 3,288,045, granted November 29, 1966, and assigned to the same assignee as that of the present invention. As disclosed in this patent, a lenticular lens or "Fly's Eye" lens structure having an array of individual plano-convex lenses is provided for fabricating a series of precision masks which permit the fabrication of approximately 1100 discrete semiconductor devices from an initial semiconductor wafer of approximately 1¼ inches in diameter. Use of the lenticulated or "Fly's Eye" lens in accordance with this patent enables the subdivision of a mask into 1100 discrete cells permitting a single pattern or configuration to be reproduced in each of the discrete cells of the mask.

In general such lenticulated lens screens are formed by embossing or molding a refractive transparent material, usually a synthetic resin, against the face of a die having a complementary matrix of recesses defining the desired array of lenses. The mechanical limitation and tolerances inherent in the various techniques available in the fabrication of such a minutely recessed die surface restricts the dimensional uniformity attainable between the multitude of lenticular die recesses. Such limitations (together with the dimensional variation inherent in present molding techniques available for conversion during and after molding into the desired multi-convex lens configuration) place further limits on the miniaturization of such lenses; and, accordingly, the number of such lenses per unit area possible (which are consonant with the desired replication in the optical resolution of each of the multitude of lenses) is restricted. However, in view of the increased trend toward further miniaturization of semiconductor devices, it is essential that the use of lenticular or "Fly's Eye" lenses in such semiconductor fabrication processes be adaptable to further miniaturization of the multi-lenses to be employed.

SUMMARY OF THE INVENTION

It has now been discovered in accordance with this invention that the individual lenses of such lenticular screens or "Fly's Eye" lenses can be greatly miniaturized and accordingly, their number per unit area increased by means of a transparent refractive member recessed with a multitude of minute concave depressions substantially filled with a refractive fluid and suitably enclosed therein. In general such a multiple of concave recesses can be readily provided in a surface of a transparent refractive sheet member by etching techniques presently available to the art. One method for fabricating such miniaturized microscopic lenses, having diameters and focal lengths ranging from the order of 10 micron to the order of 100 microns in a "Fly's Eye" array, employs the technique described by K. Peter in his article "Atzgrubchen als optische Linsen", pp. 21–26 in Physikalische Blatter, January 1961. In such a process, the author has fabricated minute concave mirrors by providing a plurality of notches on the surface of a glass member by suitable nicking with a diamond stylus or needle and then developing the notches into the desired concave configuration by etching with a suitable etchant such as hydrofluoric acid. A process of making quartz plates of a thickness of 10 microns is described on pg. 210 (cursive) in the article of the December 1966 issue of Physikalische Blatter, and authored by C. C. Connolly of the Department of Anatomy and Physics, Guy's Hospital Medical School, London.

In an alternate process, the surface of a glass sheet member is covered with a coating of photoresist, and exposed to light at each point where an individual lens is desired. A convenient manner for such exposure is by means of an "X-Y" micrometer stage wherein the coated glass member is positioned in a desired location and exposed to a finely localized point of light. By making appropriate micrometer adjustments, the coated glass member is moved to the next lens location, and the exposure repeated. The resist is then developed by conventional photolithographic technique to remove the resist in the exposed regions of the desired locations of the lenses. The resist-free areas are then subjected to conventional etchants, such as hydrofluoric acid to develop the desired concave recesses which are to form the lens structures of the lenticular screen. As will be obvious, the "X-Y" micrometer stage may also be employed with the stylus employed in the above described technique of the Peter article. Subsequent to the formation of the multitude of concave recesses in the surface of the glass member, the recesses are filled with a refractive fluid and suitably confined therein by superimposing a second refractive transparent member as a cover plate over the recessed surface of the first or base glass member to which it may be secured by adhesive or mechanical means to seal the fluid within the multitude of recesses. The resultant structure is an optical system in the form of a transparent sheet structure having a multitude of lenses in which each lens is defined in effect by a plano-convex cavity encased within the sheet structure and filled with a refractive fluid which will, for all practical purposes, have an index of refraction different than the index of refraction of the transparent material employed for the sheet structure encasing the cavity.

In the preferred form, the invention comprehends the use of an aperture plate which is interposed between the base and cover glass members of the resultant lenticular optical system. In general, the aperture plate can be made in the same "X-Y" micrometer stage employed for forming the recesses in the surface of the transparent base member. In one method, the "X-Y" micrometer stage may be employed with a punch and die set for purposes of punching the openings in the aperture plate of the desired stop settings. By appropriate manipulation of the "X-Y" micrometer positioning controls, a sufficient number of aperture plate openings can be made corresponding to the number of lenticular recesses of the base member. In addition, the openings of the aperture plate will be positioned for registry with the recesses of the transparent base member when superimposed thereon. Alternatively, the aperture plate may be formed in the "X-Y" micrometer stage in conjunction with photolithographic techniques in which a photoresist covered plate is positioned in the "X-Y" micrometer stage, and incrementably exposed to light in the desired locations by appropriate indexing. In accordance with the foregoing, lenticular screen or "Fly's Eye" lens structures can be formed with individual lenses in the structures having uniform radii of curvature as low as 25 microns or less, enabling the inclusion of an increased number of such lenses within the lenticular screen structure.

Accordingly, an object of this invention is a novel and improved lenticular screen structure of the "Fly's Eye" type.

Another object of this invention is a novel lenticular screen structure having a multitude of plano-convex lenses encased within a transparent body of refractive material.

A further object of this invention is a novel lenticular screen structure for producing a plurality of images of a master pattern.

A still further object of this invention is to provide a novel lenticular screen of the "Fly's Eye" lens type for simultaneously establishing in a photosensitive medium a plurality of images having a common configuration from a single object in the form of a master pattern.

The foregoing and other objects, features and advantages of the invention will become more apparent from the following more particular description of the preferred embodiments of the invention as illustrated in the accompanying drawings.

BRIEF DESCRIPTION OF THE DRAWINGS

In the drawings:

FIG. 1 is a perspective view of a lenticular screen in accordance with one embodiment of this invention;

FIG. 2 is an enlarged fragmentary perspective view partly in cross section of a small portion of the lenticular screen of FIG. 1 circumscribed by the broken line 1;

FIG. 2A is an exploded view in perspective of the components forming the structure shown in FIG. 2;

FIGS. 3 and 4 are perspective and cross-sectional views illustrating successive stages in the fabrication of a component for the lenticular screen of this invention;

FIGS. 5A and 5B are perspective and cross-sectional views illustrating various stages in the fabrication of a master pattern for use in the fabrication of components for the lenticular screen of this invention;

FIGS. 6A to 6D illustrate successive stages of an alternate process for fabricating the component shown in FIG. 4;

FIGS. 7A to 7F illustrate successive stages of one method of fabricating a lenticular screen structure of this invention shown in the fragmentary view of FIG. 7F;

FIG. 11 is a schematic representation of the apparatus of FIG. 10;

DESCRIPTION OF THE PREFERRED EMBODIMENTS

Figure 8A:
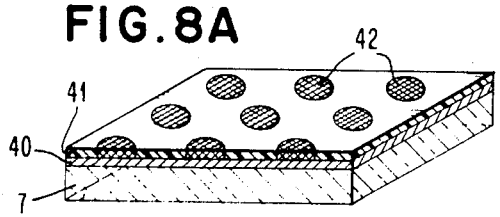
FIGS. 8A to 8F illustrate successive stages of an alternate method for fabricating a lenticular screen structure corresponding to the embodiment shown in FIG. 7F.
Figure 8B:
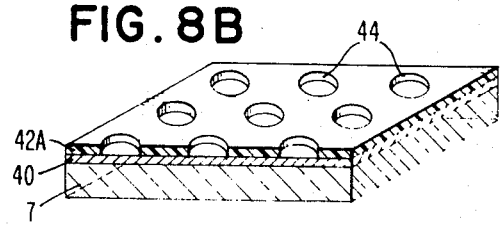
Figure 8C:
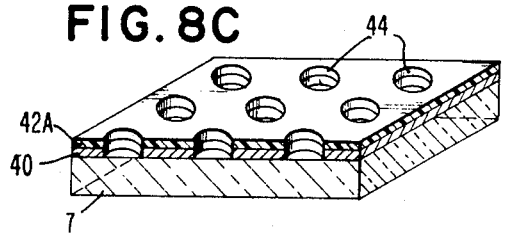
Figure 8D:
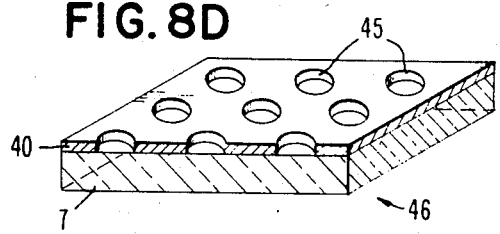
Figure 8E:
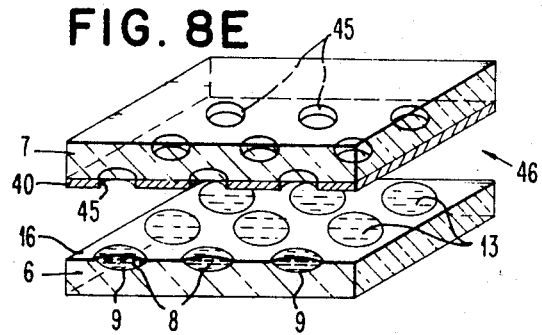
Figure 8F:
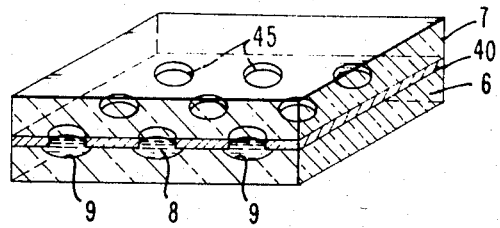

FIG. 1 shows one embodiment of a lenticular screen structure of this invention defining an optical system in the form of an integral composite sheet structure 2 having a multitude of individual substantially identical lenses 3 encased within the optical structure. In the preferred form, the multitude of lenses will normally be equispaced from each other and arranged in horizontal and vertical arrays 4 and 5, respectively, with the lenses formed together as an integral unit by virtue of the structured configuration of a transparent supporting sheet member 6 of refractive material. Although any number of lenses 3 may be incorporated in the optical structure 2, in actual practice such number of lenses may run into hundreds and thousands, including even greater densities of up to about 1 million per square inch. By virtue of this invention such lenses may have a radius of curvature of about 25 microns or smaller, which even with maximum lens diameters of 25 microns and equispaced on 9 mil spacings, of the lens centers, can provide a lens density of 10,000 lenses/square inch, and with closer spacings of the lenses, e.g., 2 mils, such lens densities may be further radically increased. In general practice, the number and dimension of the lenses need only be limited by the areas and degree of resolution required of the reproductions made with the lenticular screen of this invention. The base sheet member may be composed of any suitable refractive transparent material and includes glass, various synthetic resins, including thermoset and thermoplastic, and the like. However, because of limitations inherent in optical plastics, inorganic material, e.g., glass is the preferred medium not only for the base lens member 6 but also for the composition of the transparent cover member 7 also of similar refractive material. The limitations in the use of optical plastics are fully set forth on page 181 of the text "Applied Optics and Optical Engineering" Vol. 1, edited by R. Kingslake, Academic Press (1965), New York, wherein these limitations of optical plastics, include, "much larger expansivity than with glass, affecting thermal stability of optical performance", "much higher temperature coefficient of the index of refraction (about 0.0001 /°C)", "a much lower index of homogeneity attainable in modern practice (around 1×10⁻⁹) than with glass", and "small selection of different refraction-dispersion relations, particularly a lack of high-index material."

Typical optical glasses which may be used for the base member 6 and the cover member 7, are

| | Index of refraction |
|---|---|
| Optical glass: | |
| Ordinary crown | 1.52 |
| Borosilicate crown | 1.52 |
| Flourite | 1.43 |
| Fused quartz | 1.47 |

For most practical applications, the transparent base lens member 6 and the transparent cover lens member 7 will normally have the same indices of refraction.

The array of lenses 3 encased or enclosed within the lenticular screen 2 are formed by a refractive fluid 8 confined in a substantially plano-convex configuration by means of cavities defined between the bottom face or planar surface 10 of the transparent cover lens member 7 and the lenticular or concave recesses 9 in the adjacent surface of the base lens member 6. Isolation of the lenses is obtained by means of an opaque aperture plate 11 provided with a plurality of openings 12 corresponding in number to the number of lenses 3 and arranged so as to be disposed in registry with the lenses 3. The aperture plate 11 can be formed of any opaque material compatable with the refractive fluid employed, as for example, metals such as chromium, etc. and plastics such as Lucite and the like.

The amount or volume of the refractive fluid normally employed will be a quantity sufficient to fill the lenticular cavities formed within the optical structure 2 by the component lens member thereof 6, 7 and 11. One method of obtaining such complete filling of the cavities is by initially filling the concave cavities 9 in the recessed surface of base lens member 6 with the refractive fluid 8 in an amount more than sufficient to fill the cavities, whereby the added fluid forms an upwardly projecting meniscus 13 as more clearly shown in FIG. 7D. The quantity of fluid in the meniscus bead above the unrecessed portion of the planar surface of base lens member 6 will for all practical purposes be more than ample to fill the cavities or opening 12 of the aperture plate 11, when it is superimposed on this surface, in view of the thinness of plate 11 which will normally be of the order of 1000 angstroms (i.e. 4 millionths of an inch). However it is to be understood that the thickness of aperture plate 11 is not critical, since this particular dimensional may be varied in accordance with the practical desiderata of the operator for a particular application and the resolution and tolerances involved. Normally the aperture plate 11 will be as thin as practical, with an effective range of thicknesses being about 0.1 microns to about 0.5 microns.

Gases as well as liquids are comprehended for use as refractive fluids for purposes of this invention, with it only being necessary that the fluid chosen be chemically inert and not harmful to the materials used for base lens member 6, cover lens member 7 and aperture plate 11. Generally, however, liquids are preferred for their higher indices of refraction in view of broader and immediate scope of the application of this invention in its use for the fabrication of semiconductor devices, with it being understood that the use of gases also has utility in application such as set forth in U.S. Pat. No. 2,174,003. Normally, the fluid should be transparent and preferably clear and colorless, although colored fluid may be used as a filter, etc. In general the fluid employed will have an index of refraction different than the indices of refraction of the base lens member 6 and cover lens member 7. However, normally the fluid employed will have an index of refraction greater than that of the base lens member 6 and the cover lens member 7, although the reverse order of the indices of refraction may be employed for application such as referred to in the above identified U.S. Pat. No. 2,174,003. Typical fluids which can be employed with the invention are set forth in the table below extracted from the handbook of Physics and Chemistry, 1962—1963.

| Liquid | $N_D$ 24° C., index of refraction |
|---|---|
| Trimethylene chloride | 1.446 |
| Cineole | 1.456 |
| Hexahydrophenol | 1.466 |
| Decahydronaphthalene | 1.477 |
| Isoamylphthalate | 1.486 |
| Tetrachloroethane | 1.492 |
| Pentachloroethane | 1.501 |
| Trimethylene bromide | 1.513 |
| Chlorobenzene | 1.523 |
| Ethylene bromide and chlorobenzene | 1.533 |
| O-nitrotoluene | 1.544 |
| Xylidene | 1.557 |
| O-toluidine | 1.570 |
| Aniline | 1.584 |
| Bromoform | 1.595 |
| Iodobenzene and bromobenzene | 1.603–1.613 |
| Quinoline | 1.622 |
| α-Chloronaphthalene | 1.633 |
| α-Bromonaphthalene and α-Chloronaphthalene | 1.640–1.650 |
| α-Bromonaphthalene and α-Iodonaphthalene | 1.660–1.690 |
| Methylene iodide and iodobenzene | 1.700–1.730 |
| Methylene iodide | 1.738 |
| Methylene iodide saturated with sulfur | 1.78 |

The transparent base lens member 6 can be formed in any conventional manner, including the methods indicated above. In accordance with one method as described in the Peter article, a sheet-like transparent member 6A such as crown glass in the order of 10 mils thick $N_D$=1.52 is initially notched on its active surface 16 (FIG. 3) by a diamond stylus with a multitude of indentations 15, of about 1 micron deep, in number and at points corresponding to the number and locations of the desired array of individual lens-defining lenticular cavities 9. Conveniently the notching with the diamond stylus may be affected on an "X-Y" micrometer stage where the diamond stylus is mounted on a retainer that is associated with a punch-like mechanism. In this manner the transparent member 6A is positioned in the desired location and a first notch or indentation 15, to a desired depth, is made by lowering the stylus against the active surface 16 of the member 6A. By making appropriate micrometer adjustments, the transparent member is then moved to the desired location of the next lens area and the punch mechanism is actuated again in order to form another indentation or notch.

After all the indentations or notches 15 have been formed in the member 6A, the notches 15 are subjected to a conventional etching treatment such as described in the Peter article, e.g., 40 percent HF solution at ambient temperature, for a time sufficient, e.g., of the order of minutes, to form the lenticularly surfaced concavities or recesses 9 (FIG. 4) desired in the base lens member 6.

Figure 9:
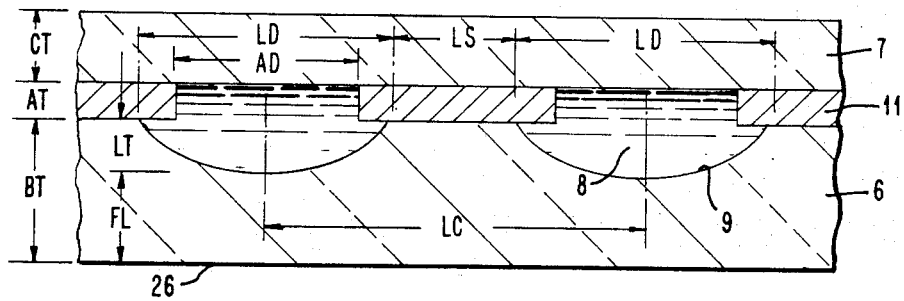
FIG. 9 is a schematic representation of a section of the lenticular screen structure shown in FIG. 7F.

In general and with reference to base lens member 6 as represented in FIG. 9, the radius of curvature for the individual lenses 9 and the thickness BT of the base lens member 6 are correlated so that the depth or sagitta, LT, of the lenticular cavities 9 will have their bottoms spaced from the opposite planar surface 26 (of base lens member 6) a distance FL substantially equal to the focal length of the lenses 9.

FIGS. 6A to 6D show various stages of another method of forming the base lens member of FIG. 4, by conventional photolithographic techniques. As shown in FIG. 6A the active surface of the transparent member 6A is coated with a photoresist layer 18 and exposed in a pattern which defines a plurality of unexposed areas 19 which correspond to the desired number and location of the lens array, and which unexposed areas are removed during the usual photographing developing process.

The successive exposure of the photoresist layer, in the desired pattern, can be readily obtained with an "X-Y" micrometer stage as indicated above.

Typical resists which may be used for such purpose are the members of the Kodak Photo Resist family sold by the Eastman Kodak Company as well as their Kodak Photo Resist Developer family for removing the unexposed, unhardened portions of the resist employed.

One method for obtaining the desired pattern of exposure of the photoresist 18 is by use of a master pattern or screen 20, as shown in FIG. 5B, comprising a transparent support 21 of optical material, such as glass, covered with a transparent overcoat 22 such as a developed photographic emulsion which includes opaque areas 23 and an intervening transparent area 24. The master pattern or screen 20 is formed by coating a surface of the transparent support member 21 with a layer 25 of a sensitized photographic emulsion or a photoresist, e.g., a sensitized silver emulsion. After this emulsion coating 25 is successively exposed to light in the various small circular areas or dots 27 at the points on the sensitized surface corresponding to the desired array of lenses in the lenticular screen which render these areas opaque upon processing in accordance with well know techniques. The development of the exposed coating produces the master pattern shown in FIG. 5B having the opaque areas circumscribed by the intervening transparent area.

The master pattern 20 (FIG. 5B) may be superimposed on a photoresist covered transparent base member 28 (FIG. 6A) comprised of the indicated transparent sheet member 6A coated with an acid resistant photoresist layer 18 (e.g., Kodak Photoresist). Preferably the image carrying face of the master pattern 20 will be adjacent to and in contact with the photoresist layer 18 on the sheet member 6A. The resultant assembly is exposed through the master pattern 20. Processing of the thus exposed photoresist will then result in removal of the unexposed circular areas 19 which were shielded from the light by the opaque areas 23 of the master pattern 20 (FIG. 5B). The resultant structure is shown in FIG. 6C where the remaining resist 30 circumscribes an array of circular openings 31 extending to the active surface of the transparent member 6A to provide a protective mask for etching the transparent member in the unprotected areas defined by the openings 31.

Etching of the resist masked transparent base member 6A in accordance with the techniques indicated above (for example with a 40 percent HF solution at 20°C.) produces the desired base lens member 6, now recessed with the lenticular cavities 9 whose depth may be controlled by the duration of the etching operation and the strength of the etchant. After the etching operation, the remaining photoresist coating 30 is removed to provide the final form of the base lens member 6, as in FIG. 4 which is to form a component in the optical system of the invention.

The aperture plate 11 (FIG. 9) can also be made by various modifications and applications of conventional photolithographic techniques. In the specific embodiment of the aperture plate 11 (FIG. 9) described, the aperture openings 12 are formed with a diameter smaller than the diameter LD of the lenticular cavities 9 in the base lens member for purposes of providing the proper stop in order to minimize any aberrations caused by the peripheral portions of the lens. In such a dimensional relationship between the lenses and the aperture openings, the lens diameter will concentrically circumscribe the aperture opening to leave portions of the aperture plate 11 adjacent the opening projecting concentrically over the concave recesses.

Various stages of one process of fabricating an aperture plate 11 are shown in the series of FIGS. 7A to 7F illustrating one method of forming an embodiment of the optical system of this invention. In this method an opaque thin base sheet 32 of any suitable material such as plastic or metal and the like (as for example a thin film of chrome of about 2000 A. thick) is coated with a photoresist layer 33 and exposed to produce a latent image defining the areas 34 of the pattern of openings 12 which are desired in aperture plate 11. Exposure of the photoresist layer 33 may be accomplished as above by successive exposures with a small circular dot of light in an "X-Y" micrometer stage or by use of a master stencil similar to the master pattern shown in FIG. 5B and formed by essentially the same method employed therefor.

The exposed unit is then developed for removal of the unexposed resist in the areas 34 to form an array of openings 35 extending through the opaque sheet 32. The resist-masked unit may then be conventionally etched (e.g., 5 parts concentrated nitric acid and 2 parts concentrated hydrofluoric acid at ambient temperature) to remove the portions of the opaque sheet 32 circumscribed within the openings 35 in the resist layer 33 to form the desired aperture 12. The remaining layer 33 of the resist is then removed to provide the desired aperture plate 11 having the etched opening 12 extending therethrough as shown in FIG. 7C. As will be understood the particular diameter or stop of the openings 12 may be readily controlled by appropriate control of the processing steps therefor, particularly so with respect to the diameter or dimensions of the opaque areas initially formed on the master stencil employed.

Specific utilization of the aperture plate 11 into the optical system of this invention is shown in the stage illustrated by FIG. 7D. In this stage the cavities 9 of the base lens member 6 are flooded with an exactly measured amount of a refractive fluid 8, such as aniline to form a meniscus 13 of the fluid, projecting above the plane of the active face of the base lens member 6. Thereafter, the aperture plate 11 is superimposed on the active face of the base lens member 6 with their respective opening 12 and lenticular recesses 9 disposed in register with each other.

With a sufficiently thin aperture plate, the excess quantity of the refractive fluid defined within the meniscus 13 will be more than ample to fill the space of the cell defined within each corresponding opening 12 of the aperture plate 11. As will be obvious, where the surplus of fluid within the meniscus 13 exceeds the volume of the void within the aperture openings 12, the excess fluid extending above the aperture plate may be simply removed by wiping it from the exposed face of the aperture plate 11.

In the next stage (FIG. 7E), a transparent sheet member 17 of refractive material is superimposed on the exposed face of the aperture plate 11 as the cover lens component 7 of the optical system as shown in FIG. 7F. The final assembly of the desired optical system may then be integrated in any conventional manner as by mechanical sealing about the edges of the assembly or by use of adhesive initially interposed between the various basic components, i.e., base lens member 6, aperture plate 11 and cover lens member 7.

A modified method of making the optical system of this invention is shown in the various stages illustrated in FIGS. 8A to 8F. In this modification the cover lens member 7 and the aperture plate 11 are fabricated as an integral unit 46. Initially, the lens cover member 7 of refractive transparent material is suitably coated with a thin opaque layer 40, such as a film of chrome, which in turn is coated with a photoresist layer 41. The resultant sandwich is then exposed, as by the technique previously discussed, to produce a latent image in the shaded area 42 of the photoresist coating 41 corresponding to the pattern of openings desired in the aperture plate 40. As above, the exposed sandwich is developed to remove the unexposed portions of the photoresist, in the areas 42, to form an array of openings 44, in the resist layer 41, extending to the opaque layer 40. The exposed layer is then etched as before (e.g., with a solution containing 20 gr. potassium ferricyanide, 60 gr. sodium hydroxide, 1 liter water) to remove the unprotected portions of the opaque chrome layer to form the aperture openings 45 in the opaque layer 41. The remaining portions of the resist 42A are removed to obtain an integrated cover lens member/aperture plate unit 46 shown in FIG. 8D characterized by a cover lens component 7 and an aperture plate 40 provided with openings 45 of the desired diameter.

The final optical system of this invention may be formed by superimposing the integrated unit 46 on the active surface 16 (FIG. 8E) of a base lens member 6 which was flooded with a refractive fluid to fill the lenticular cavities 9 with sufficient fluid 8 to form the meniscus 13. The resultant assembly of components may then be integrated into unitary form by any suitable method, as indicated above.

FIG. 9 depicts diagramatically a fragmentary portion of a lenticular screen or "Fly's Eye" lens of the invention for purpose of illustrating a typical dimensional relationship of such a multi-lens structure:

| | | |
|---|---|---|
| Thickness of base lens member (BT) | mm | 0.278 |
| Thickness of cover lens member (CT) | mm | 1.0 |
| Length from unrecessed surface of base lens member to bottom of lens unit (FL) | mm | 0.275 |
| Thickness of aperture plate | microns | 0.2 |
| Diameter of aperture opening (AD) | do | 15.0 |
| Diameter of lens unit (LD) | do | 24.0 |
| Depth of lens unit (LT) | do | 3.0 |
| Center-to-center spacing of lens units (LC) | do | 40.0 |
| Edge-to-edge spacing of lens units (LS) | do | 16.0 |

Figure 10:
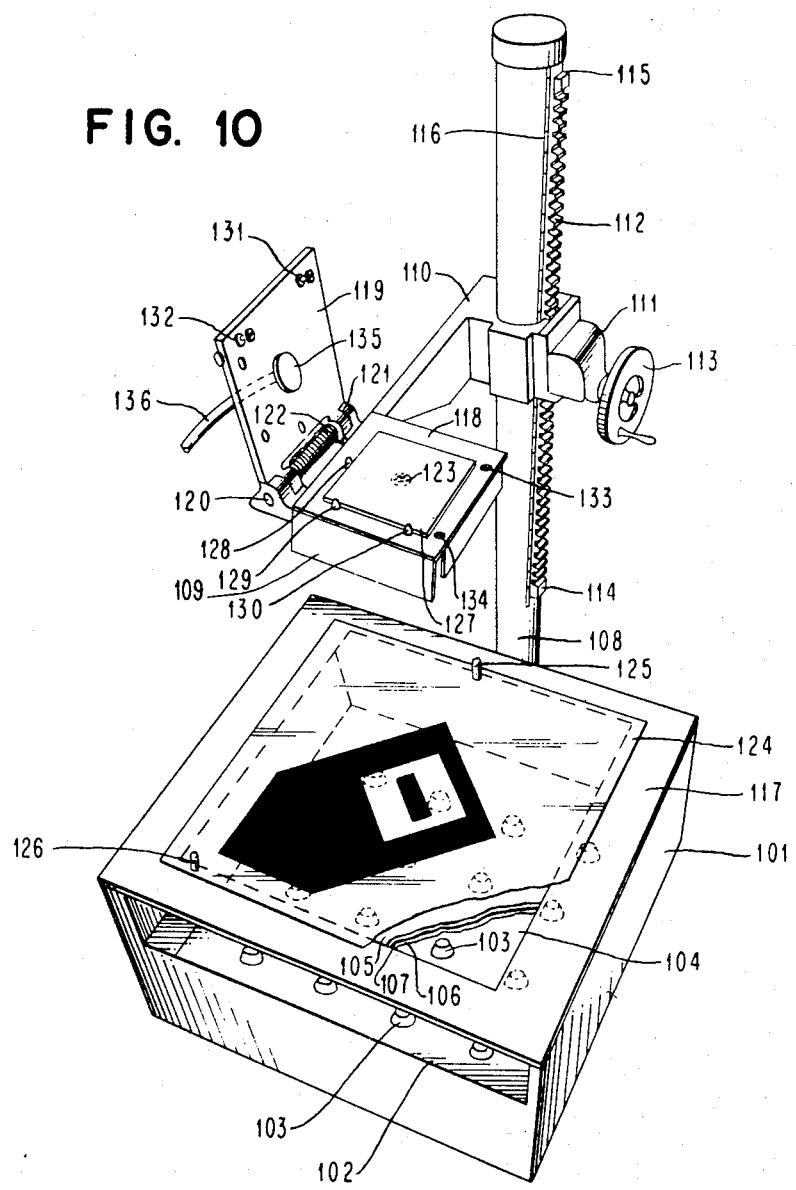
FIG. 10 represents an apparatus for employing a lenticular screen of this invention in the fabrication of semiconductor devices.

With the dimensions noted, a multitude of microscopic images of a single object or pattern may be photographically established in any suitable photosensitive medium for various applications. A specific example of the utilization of the optical system of this invention is in the preparation of masks, with apparatus such as described in the aforesaid U.S. Pat. No. 3,288,045 for use in the production of semiconductor devices. Such an apparatus is shown in FIGS. 10 and 11 which is generally based on optical and photographic principles, it includes a base assembly 101 with a light box 102. The light box 102 houses a number of light sources 103 that are arranged in a 4-by-4 matrix within light box 102 for uniform light distribution.

Above the light box 102 and integrally formed in the base assembly 101, is a square flanged opening 104. The flanged opening 104 accommodates two pieces of plate glass 105 and 106 which have a piece of translucent paper 107 sandwiched between them for light diffusion purposes. The pieces of glass 105 and 106 and paper 107 are shown slightly cut away for clarity.

Attached to the base 101 in a vertical position is a cylindrical column 108 which supports a platform 109 by an extension arm assembly 110. The platform 109 is centrally positioned above light box 102. The arm assembly 110 houses gear elements in a housing 111 which cooperate with a gear rack 112 on column 108. The gearing arrangement is manually controlled by a crank wheel 113 and permits vertical positioning of the arm assembly 110 and the attached platform 109 from a lower limit of travel 114 to an upper limit of travel 115 on column 108.

A linear scale 116 may be provided on column 102 in suitable graduations, such as in inches (ex., 5 inches at the lower limit to 33 inches at the upper limit) to provide a convenient means for establishing a desired object distance.

Platform 109 supports a cover assembly 119 be means of hinges 120 and 121 for pivoting the cover assembly 119 from an open position, as shown, to a closed position. The cover assembly 119 is normally biased in an open position by means of a helical spring 122.

Mounted on platform 109 is an optical system 123 of this invention such as shown in FIG. 1 herein. For most operations the platform 109 will be suitably recessed for mounting the optical unit 123 with its cover lens member 7 down and to dispose the exposed face of the base lens member 6 flush with the upper surface 118 of platform 109.

In practice, the apparatus of FIG. 10 is placed in a photographic dark room. A master pattern or object 124 is placed on the surface 117 of the base assembly 101 in a predetermined position, with alignment of the pattern 124 being effected by means of openings in the pattern 124 which receive alignment pins 125 and 126. A piece of film or a glass plate with photographic emulsion 140 (FIG. 11) on the bottom face or a properly treated circuit element or substrate (such as a silicon wafer that is coated with photoresist on the bottom active surface) is then placed in position for exposure with the multi-lens optical unit 123, and flush with the upper surface 118 of platform 109. Such a photographic unit is designated 127 in FIGS. 10 and 11.

In actual practice for the production of integrated semiconductor devices, the master pattern 124 will represent one of a series of patterns for producing a corresponding number or masks. The instant pattern represents one of a series of related patterns shown in the aforesaid U.S. Pat. No. 3,288,045. Accordingly, as will be apparent, for each master pattern of the series, a fresh photographic film or plate 127 will be placed on the platform 109 in FIG. 10 adjacent the multi-lens optical unit 123.

When the photographic plate or element 127 is properly positioned, the hinged cover 119 is closed so that the bolts 131 and 132 engage openings 133 and 134 to latch the cover 119 in the closed position. Cover 119 contains a centrally located diaphragm 135 which can be inflated through a flexible conduit 136 from any suitable air supply, not shown. This exerts pressure on the plate or element 127 to force its proper contact with the multi-lens optical unit 123 during exposure.

For exposure of photographic plates, light source 103 is normally comprised of incandescent lamps and for exposure of circuit elements coated with photoresist, the light source ordinarily comprises a source providing ultra-violet rays.

By sequential exposures of photographic plates 127 with a series of related master patterns in accordance with the foregoing, a series of photographic masks can be produced with each mask having a multitude of microscopic images or patterns which are essentially reduced reproductions of the master pattern used for the exposure, as for example, the master pattern 124 of FIG. 10. The resultant mask is shown in FIG. 12 where a photographic mask 141 is indicated as having a matrix of images 142, four of the images 143—146, that lie within the outlined rectangle 147 of the matrix 142, have been projected forward in order to show their similarity to the master pattern 124 in FIG. 10 from which the particular mask is shown to have been produced.

Figure 12:
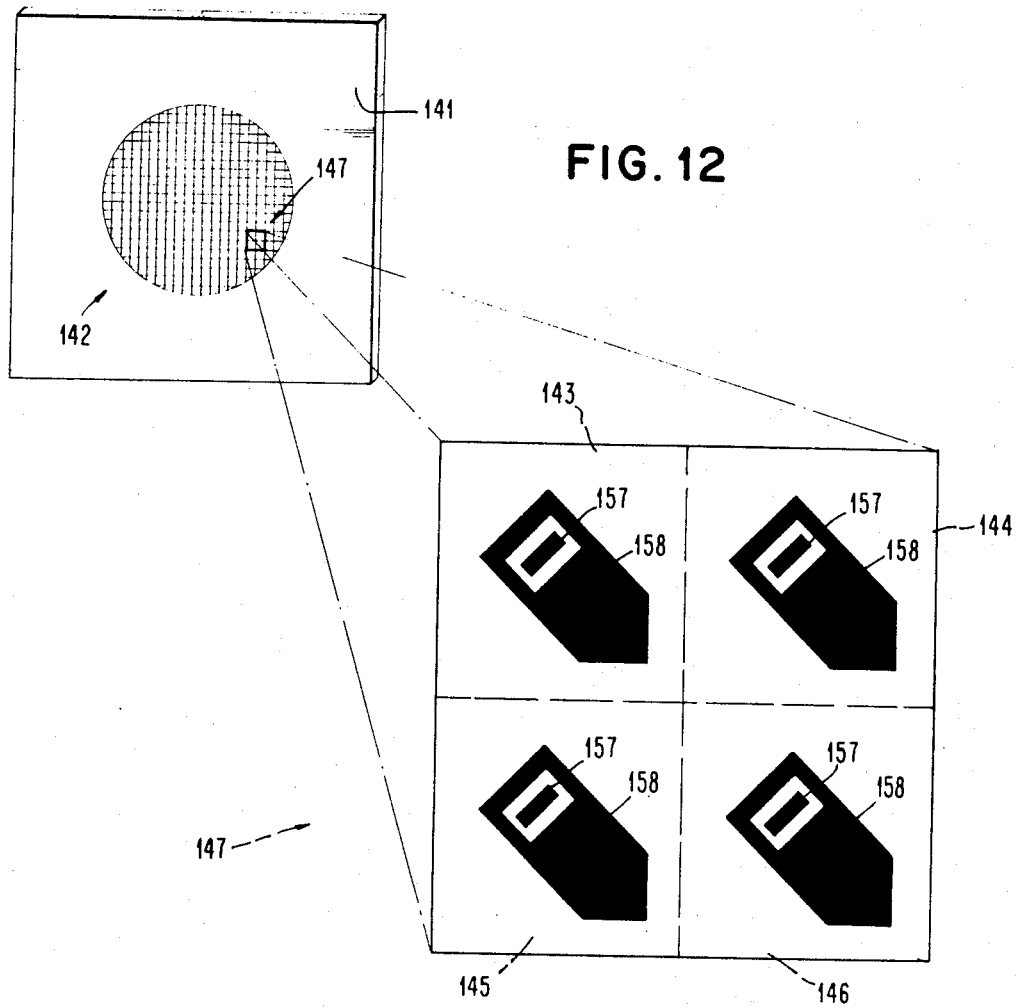
FIG. 12 illustrates a mask for an integrated circuit device produced by the apparatus of FIG. 10 utilizing a lenticular screen of this invention.

Normally, each photographic mask such as mask 141 of FIG. 12 would be used at a particular step in the production of semiconductor devices. For example one photographic mask would be used to establish photoresist patterns on a semiconductor wafer for control of base diffusion. A second mask would be used to establish a photoresist pattern on the semiconductor wafer to control emitter diffusions with other masks in a related series used to control other steps in the fabrication of semiconductor devices. Solely for purpose of illustration the mask 141 of FIG. 12 will be assumed to be designed for purposes of establishing photoresist patterns on semiconductor devices for controlling base diffusion.

Figure 13:
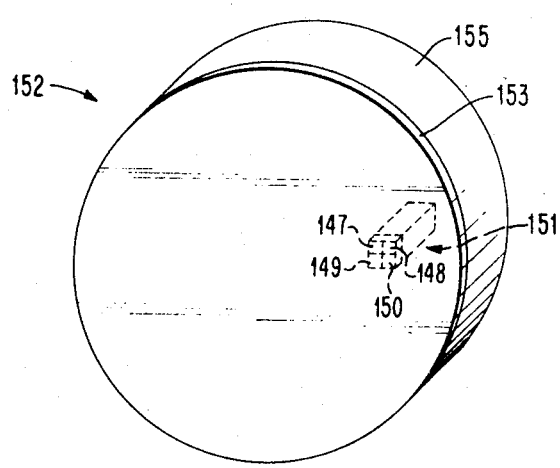
FIGS. 13 to 13D illustrate various stages in the fabrication of semiconductor devices utilizing a mask structure formed with the use of a lenticular screen of this invention.
Figure 13A:
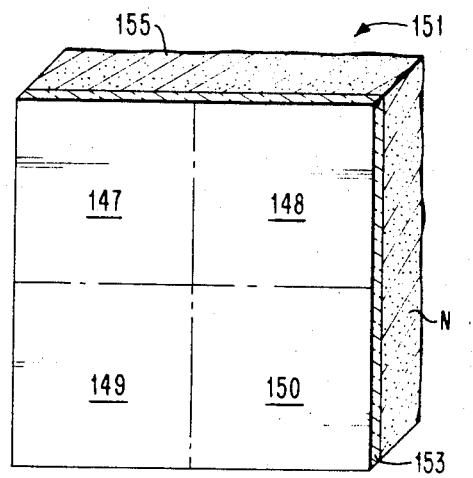

For purposes of simplicity, in illustrating the use of the invention in such application, four unit cells or chips 147—150 have been selected from the outlined rectangle 151 of a semiconductor wafer 152 (FIG. 13) which correspond in location to the individual images 143—146 of the photographic mask 141 (FIG. 12).

Figure 13B:
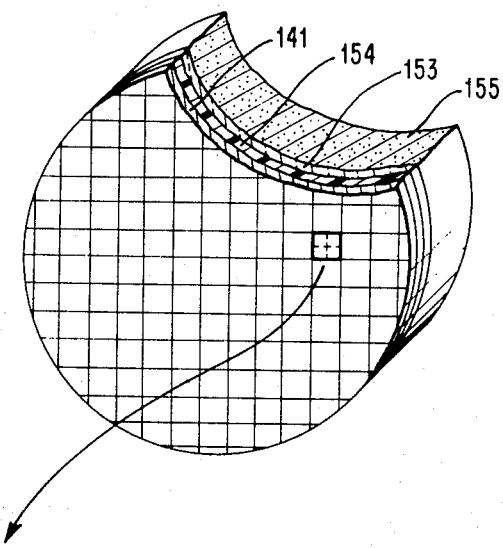

Preliminary to the present stages of the process, a semiconductor wafer 152, such as an N-type material of silicon forming N-type substrate 155, is oxidized to establish a coating 153 of silicon dioxide. A layer of photoresist 154 is coated over the silicon dioxide layer 153 (FIG. 13B).

Figure 13C:
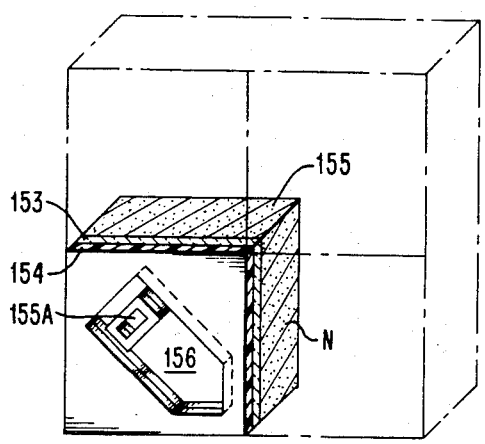

A pattern for etching purposes is then established by placing the photographic mask 141 (FIG. 12) over the photoresist layer 154 and exposing the assembly to ultra-violet light. Unexposed areas will be retained in the photoresist layer 154 corresponding to the opaque portions 157 and 158 in the individual cells 143—146 of the photographic mask 141. The photoresist is then developed to insolubilize the exposed areas of the photoresist while dissolving the unexposed areas. This results in the formation of open areas 155a and 156 (FIG. 13C), (corresponding to the opaque portion 157 and 158 in cells 143 to 146 of mask 141 (FIG. 12)), to expose the undercoat 153 of silicon dioxide (below the photoresist layer) to etchants, such as hydrofluoric acid, for example, which etch away the silicon dioxide to expose the base silicon in these areas 155a and 156.

Figure 13D:
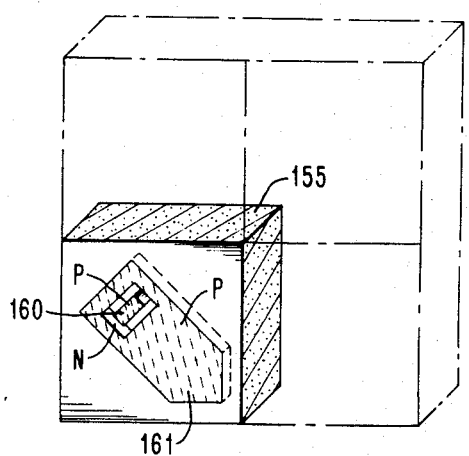

The wafer assembly then undergoes diffusion so that the silicon substrate 155 in each unit cell has formed therein base areas 160 and 161 (FIG. 13D) which is a P-type material such as boron. During the diffusion operation a silicon dioxide layer is reformed, and the assembly recoated with photoresist layer for further exposure with additional similar masks of a related series. However for purposes of simplicity the boron-diffused structure is shown in FIG. 13D stripped of the photoresist layer 154.

Although the multi-lens optical system of this invention has been described with respect to its utility in the fabrication of photographic masks for the manufacture of semiconductor devices, it is to be understood that the optical system can also be used for the direct exposure of photoresist coated semiconductor wafers in the manner described in the aforesaid U.S. Pat. No. 3,288,045 whose teachings are incorporated herein by reference thereto.

Figure 14A:
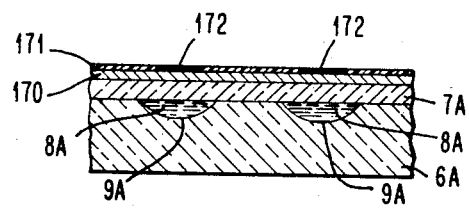
FIGS. 14A and 14B are fragmentary cross-sectional views of another embodiment of this invention.
Figure 14B:
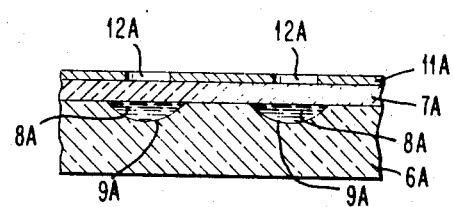

Another embodiment of the multi-lens optical system of this invention is shown in FIGS. 14A and 14B. This embodiment is substantially the same as the preceding embodiment with the exception that the aperture plate 11A is disposed externally of the assembly by its superimpositioning on the outer face of the transparent cover lens member 7A. In this embodiment a transparent base lens member 6A is provided by lenticular lens recesses 9A filled with a refractive fluid 8A which is sealed in the recess by the cover lens member 7A superimposed on the cavitated surface of the base lens member 6A. The exposed surface of the cover lens member is then coated with an opaque layer 170 of suitable material, as for example, chromium by evaporation, which in turn is coated with a photoresist layer 171 for suitable exposure to form latent images 172 of the desired aperture openings 12A. Development of the exposed resist, results in the removal of the photoresist in the area 172 which bares a corresponding area of the chromium layer which is removed by etching. Subsequent removal of the remaining photoresist layer 171 produces the structure shown in FIG. 14B. In a modification of this embodiment, if desired, the indicated layer of chromium may be omitted, and the exposed and developed photoresist may itself serve as an aperture plate.

Figure 15:
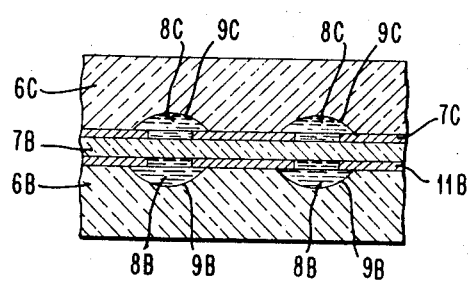
FIG. 15 is a fragmentary cross-sectional view of a further embodiment of this invention.

A further embodiment of this invention is shown in FIG. 15 utilizing individual components fabricated by the methods afore-described. For this embodiment, a basic unit may be initially constructed equivalent to that shown in FIG. 1 and comprising a base lens member 6B superimposed successively with an optional aperture plate 11B and a cover lens member 7B to encase lenticular recesses 9B filled with a refractive fluid 8B. For this modification the second aperture plate 7C, if employed, is superimposed on the exposed face of the cover lens member 11B. The resultant structure is then superimposed on a second base lens member 6C having its recessed surface disposed adjacent the second aperture plate 7C. In this manner a second array of lenticular cavities 9C become encased in the unit with a refractive fluid disposed therein to form a second array of lenses in association with the array of lenses defined by cavities 9B of the first base lens member 6B. In this manner, various combinations of the components, having different indices of refraction, may be employed for optical corrections, as for example, aberration.

While the invention has been particularly shown and described with reference to preferred embodiment thereof, it will be understood by those skilled in the art that the foregoing and other changes in form and detail may be made therein without departing from the spirit and scope of the invention.

I claim:

1. An optical system comprising a first sheet of transparent material; a multiplicity of concave lenticular recesses in a surface of said sheet with said multiplicity of said recesses disposed in horizontal and vertical arrays; an aperture plate superimposed on said surface and having a number of openings corresponding to and in register with the number of said recesses; a second transparent sheet of said material superimposed on the exposed face of said plate; and a fluid in and substantially filling said recesses with said fluid and said material having different indices of refraction.

2. The optical system of claim 1 wherein said recesses comprise with said fluid an arrangement of equispaced minutely dimensioned lenses.

3. An optical system comprising a first sheet member of transparent material; a plurality of minute concave lenticular recesses in a surface of said sheet member and disposed in horizontal and vertical arrays; an aperture plate superimposed on said surface and having a number of openings corresponding to and in register with said recesses; a second sheet member of transparent material superimposed on the exposed surface of said plate; and a refractive fluid in and substantially filling said recesses with said fluid and said materials having different indices of refraction.

4. The optical system of claim 3 wherein the materials of the said first and second sheet members have the same indices of refractions.

5. The optical system of claim 3 including a third sheet member of refractive transparent material; a second plurality of concave lenticular recesses in a surface of said third sheet member with the recessed surface of said third sheet member superimposed on the exposed surface of the said second sheet member with said second plurality of recesses corresponding in number to and in register with the first said plurality of recesses; and a second refractive fluid in and substantially filling said second plurality of recesses.

6. The optical system of claim 5 including a second apertured plate interposed between said third sheet member and said second sheet member with said second plate having a number of openings corresponding to and in register with said second plurality of recesses.

7. An optical system comprising a first refractive sheet member of transparent sheet member of transparent material; a multiplicity of concave lenticular recesses in a surface of said sheet member wherein said multiplicity of said recesses is disposed in horizontal and vertical arrays; a second refractive sheet member of transparent material superimposed on said surface; a refractive fluid in and substantially filling said recesses; and an apertured plate superimposed on the exposed face of said second sheet member with said plate having a number of openings corresponding to and in register with the number of said recesses.